United States Patent [19]

Taylor

[11] Patent Number: 5,490,557
[45] Date of Patent: Feb. 13, 1996

[54] HOUSING FOR A HEAT RECOVERY VENTILATOR WITH FANS HINGEDLY MOUNTED TO HOUSING

[75] Inventor: Wayne H. Taylor, Peterborough, Canada

[73] Assignee: Trent Metals Limited, Peterborough, Canada

[21] Appl. No.: 319,699

[22] Filed: Oct. 7, 1994

[51] Int. Cl.6 .................................................. F24H 3/02
[52] U.S. Cl. .............................. 165/54; 165/77
[58] Field of Search ........................ 165/54, 77

[56] References Cited

U.S. PATENT DOCUMENTS

| | | | |
|---|---|---|---|
| 1,782,711 | 11/1930 | Callahan | 165/54 |
| 2,122,454 | 7/1938 | Child . | |
| 4,109,708 | 8/1978 | Imral | 165/54 |
| 4,475,687 | 10/1984 | Schutz et al. | 165/77 |
| 4,512,392 | 4/1985 | Van Ee et al. | 165/54 |
| 4,512,393 | 4/1985 | Maendel | 165/54 |
| 4,550,773 | 11/1985 | Martin | 165/54 |
| 4,817,708 | 4/1989 | Ono et al. | 165/54 |
| 4,825,815 | 5/1989 | Turner | 165/77 |
| 4,874,042 | 10/1989 | Becker | 165/54 |
| 5,035,281 | 7/1991 | Neuenfeldt et al. | 165/77 |
| 5,070,934 | 12/1991 | Kucharczyk | 165/54 |
| 5,220,955 | 6/1993 | Stokes | 165/54 |
| 5,282,770 | 2/1994 | Shibata | 454/239 |

OTHER PUBLICATIONS

Brochure entitled: "Summeraire Central Ventilation Systems", dated Apr. 4, 1994, Trent Metals Limited, Peterborough, Ontario, Canada.

Primary Examiner—John K. Ford
Attorney, Agent, or Firm—Jeffrey Imai; Arne I. Fors; D. Doak Horne

[57] ABSTRACT

In a heat recovery ventilator, a housing has an inlet and an outlet for a first fluid flow and an inlet and an outlet for a second fluid flow, and has a heat exchange panel assembly having two sets of panels alternately arranged to form a first and a second flow path for each of the first fluid flow and the second fluid. The first flow path is in fluid communication with the first fluid flow inlet and outlet and the second flow path is in fluid communication with the second fluid flow inlet and outlet. The heat exchange panel is slidably mounted within the housing. A first fan and a second fan is mounted on a fan mounting plate. The fan mounting plate is hingedly mounted to the housing and is pivotable between a servicing position and an operational position. The first and second fans are removable from the housing for servicing upon rotating the fan mounting plate to the servicing position and positioned within the housing for effecting the first fluid flow and the second fluid flow when the fan mounting plate is in the operational position.

4 Claims, 3 Drawing Sheets

5,490,557

HOUSING FOR A HEAT RECOVERY VENTILATOR WITH FANS HINGEDLY MOUNTED TO HOUSING

FIELD OF INVENTION

This invention relates to a housing for a heat recovery ventilator. In particular, this invention relates to improvements in a housing of a heat recovery ventilator for improving the serviceability thereof.

BACKGROUND OF INVENTION

Heat recovery ventilators are used to improve the efficiency of a house or other building structure. A heat recovery ventilator provides fresh air into the house or building while exhausting an equal amount of stale air. During the winter months, the heat recovery ventilator warms the incoming cold fresh air with heat reclaimed from the exhausted stale air. During the summer months, the cool outgoing stale air from air conditioned homes is used to cool incoming fresh air.

Heat recovery ventilators all have the same basic structure. A heat exchange core is mounted within a housing for defining two separate airflow paths, an incoming path and an outgoing path. The heat recovery ventilator normally has two fans mounted on the housing for creating the requisite air flows. A typical housing for a heat recovery ventilator is illustrated in U.S. Pat. No. 4,874,042.

In recent years, the heat recovery ventilators have been becoming increasingly more complicated with new added features. Heat recovery ventilators are now being fitted with an electric defrost element and a temperature controller in the incoming fresh air supply for defrosting the heat exchange core if the outside temperature falls below a pre-determined freezing temperature.

As these features are added, the space within the housing becomes more limited. It is possible to increase the size of the housing. However, this option is not desirable in terms of consumer requirements and shipping costs.

In the servicing of heat recovery ventilators, the fans are the single most part which requires repair and replacement. However with the increase in the number of features and limited space within the housing, it becomes increasingly more difficult to service a heat recovery ventilator and have access to the fans.

SUMMARY OF THE INVENTION

The disadvantages of the prior art may be overcome by providing a housing for a heat recovery ventilator which permits the fans to be removable from the housing upon pivoting a fan mounting plate.

According to one aspect of the invention, there is provided in a heat recovery ventilator, a housing having an inlet and an outlet for a first fluid flow and an inlet and an outlet for a second fluid flow, and having a heat exchange panel assembly having two sets of panels alternately arranged to form a first and a second flow path for each of the first fluid flow and the second fluid. The first flow path is in fluid communication with the first fluid flow inlet and outlet and the second flow path is in fluid communication with the second fluid flow inlet and outlet. The heat exchange panel is slidably mounted within the housing. A first fan and a second fan is mounted on a fan mounting plate. The fan mounting plate is hingedly mounted to the housing and is pivotable between a servicing position and an operational position. The first and second fans are removable from the housing for servicing upon rotating the fan mounting plate to the servicing position and positioned within the housing for effecting the first fluid flow and the second fluid flow when the fan mounting plate is in the operational position.

In another aspect of the invention, a heat recovery ventilator has a fan mounting plate which supports a heat exchange panel when in an operational position.

In another aspect of the invention, a heat recovery ventilator has a heat exchange panel which slidingly engages the fan mounting plate.

In another aspect of the invention, a heat recovery ventilator has a housing comprising a rear panel, top panel, bottom panel, two end panels and a front panel. The inlets of the first and second fluid flows are mounted on one of the two end panels and the outlets of the first and second fluid flows are mounted on the other of the two end panels.

In another aspect of the invention, a heat recovery ventilator has a fan mounting plate which is pivotable when the heat exchange panel is removed from the housing.

In another aspect of the invention, a heat recovery ventilator has a fan mounting plate which separates the first and second fluid flow on one side of heat exchange panel.

DETAILED DESCRIPTION OF THE DRAWINGS

In figures which illustrate the embodiments of the invention:

DETAILED DESCRIPTION OF THE INVENTION

Figure 1:
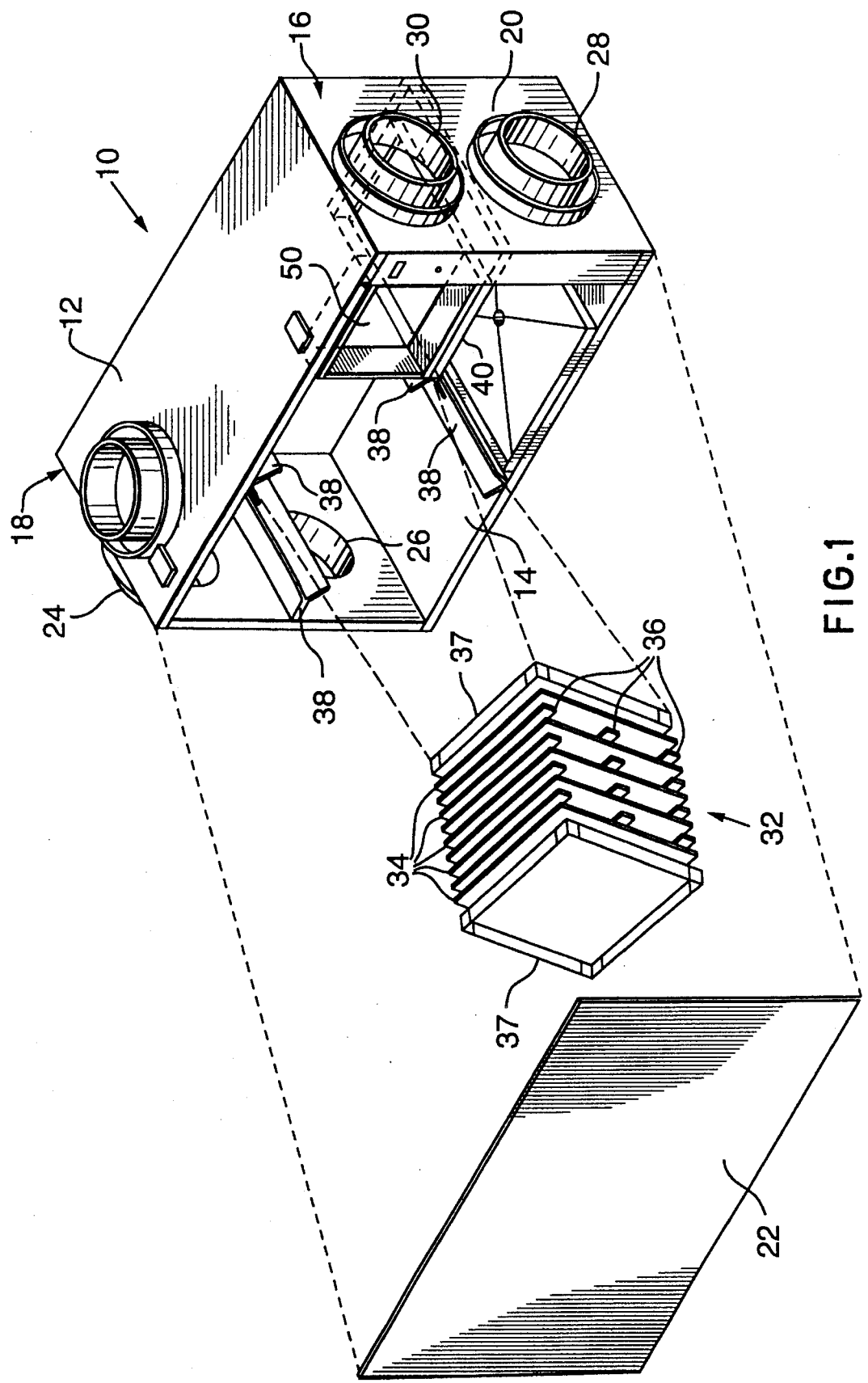
FIG. 1 is an exploded perspective view of the preferred embodiment of the present invention.

The preferred embodiment of the present invention is illustrated in FIG. 1. The heat recovery ventilator comprises a housing 10 having a top panel 12, a bottom panel 14, a rear panel 16, two end panels 18 and 20 and a removable front 22. Front panel 22 is attached to the housing using suitable fasteners.

Housing 10 is generally parallelepiped in shape. Housing 10 has a longitudinal extent greater than a height, greater than a front to back depth. Air flow through the housing 10 is generally longitudinally.

End panel 18 has an inlet 24 and an inlet 26. End panel 20 has an outlet 28 and outlet 30.

At one end of housing 10, heat exchange panel 32 is slidably mounted. Heat exchange panel 32 has a plurality of oriented panels 34 separated by spacers 36. Panels 34 and spacers 36 generally has two sheets sandwiching a corrugated layer. Such panels are commercially available under the trade-mark COROPLAST. Panels 34 and spacers 36 are alternately layered to define two separate flow paths through the heat exchange panel 32. Panels 34 and spacers 36 are bonded together and between caps 37 to form a cohesive heat exchange core 32. Clear silicone can be used to bond together the components of the heat exchange core 32. The corners are caulked to prevent cross contamination of the two fluid flow paths.

Figure 5:
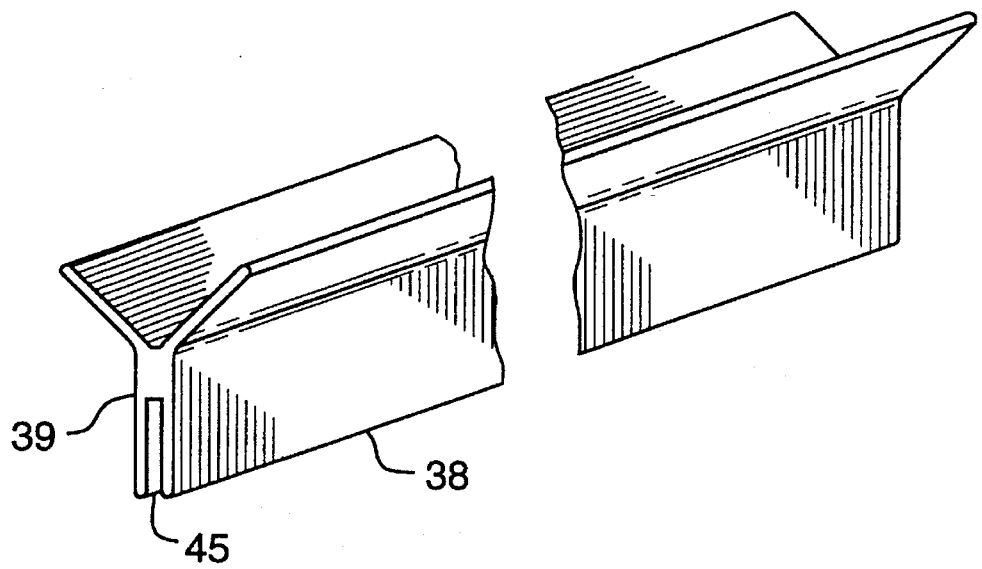
FIG. 5 is a perspective view of the corner extrusion for mounting the heat exchange core.

Top panel 12, bottom panel 14 and end panel 18 each has a corner extrusion 38 mounted thereon for slidably receiving heat exchange panel 32. Corner extrusion has a Y-shape in cross section as illustrated in FIG. 5. The lower section 39 has a cut 45 for frictionally fitting with a sheet fitting, such as fan mounting plate 40. Similarly top panel 12, bottom panel 14 and end panel 18 are provided with a thin sheet strip to receive corner extrusion 38.

Figure 2:
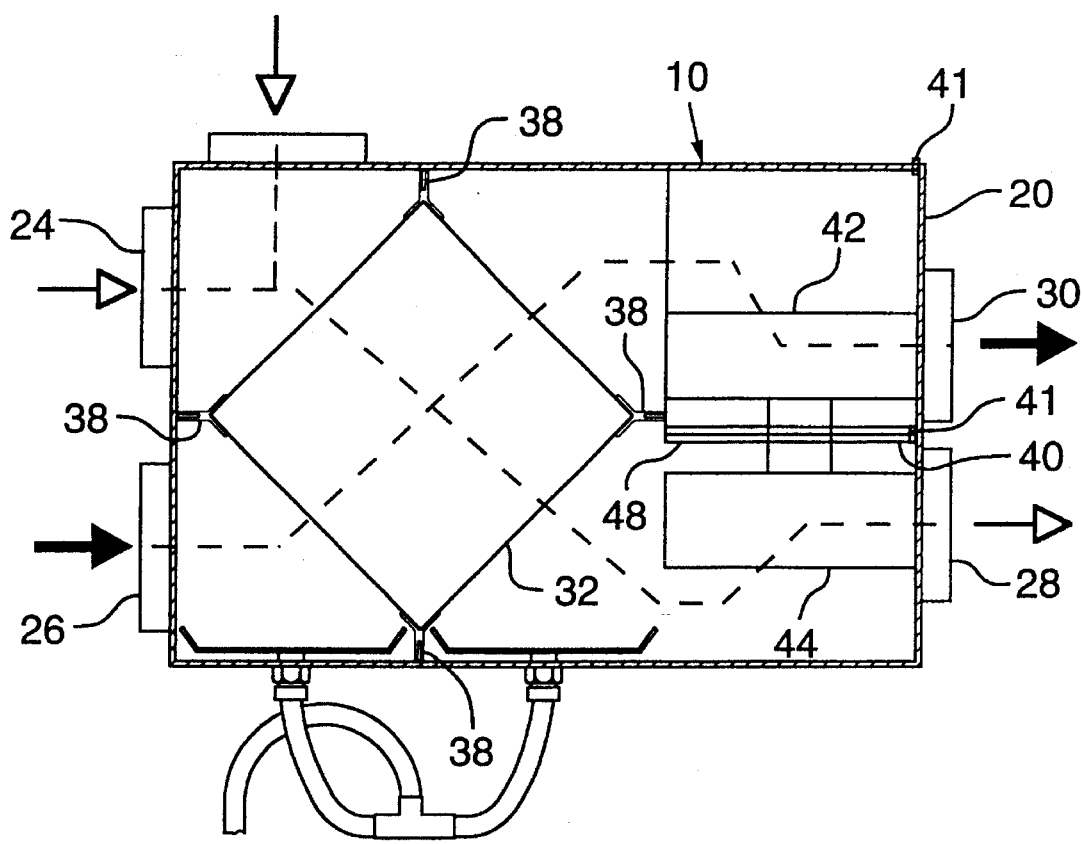
FIG. 2 is a side elevational view of the embodiment of FIG. 1.
Figure 3:
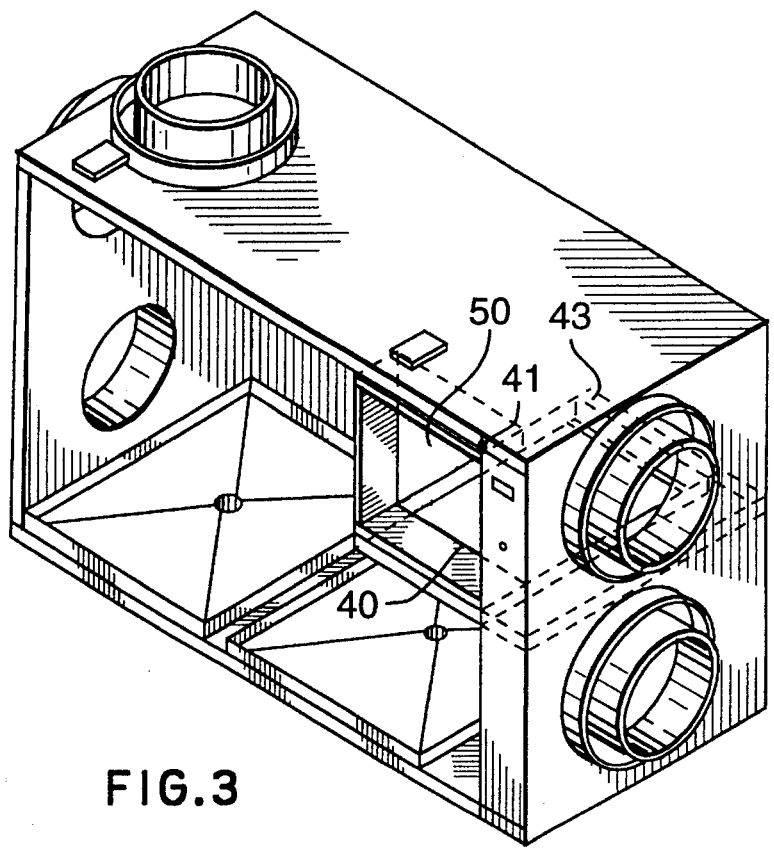
FIG. 3 is a perspective view the embodiment of FIG. 1 with the exchange core removed and the fan mounting plate in an operational position.
Figure 4:
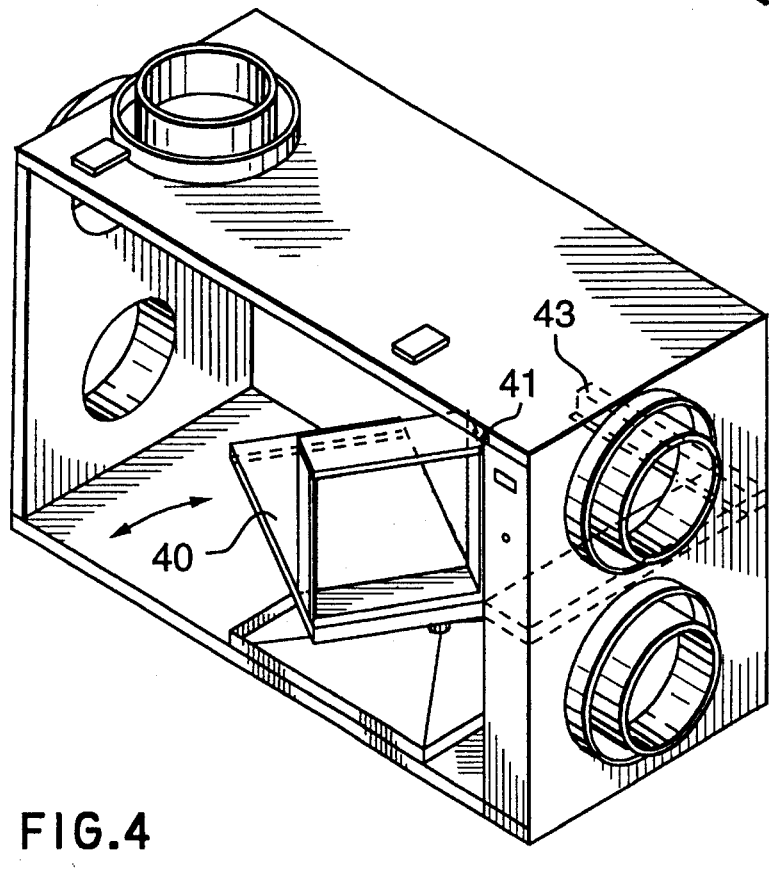
FIG. 4 is a perspective view of the embodiment of FIG. 1 with the exchange core removed and the fan mounting plate in a servicing position.

Referring to FIG. 2, end panel 20 has fan mounting plate 40 pivotally mounted thereto at approximately the mid-height. Pins 41 are used to mount fan mounting plate to end panel 20. When heat exchange panel 32 is removed from the housing 10, fan mounting plate 40 is pivotable between an operational position as illustrated in FIG. 3 and a servicing position as illustrated in FIG. 4.

Fans 42 and 44 are mounted on opposite sides of mounting plate 40. Fan mounting plate 40 acts as a divider between the two fluid streams. Fans 42 and 44 are mounted in a conventional manner such that when fan mounting plate 40 is in the operational position, fan 42 and 44 are in fluid communication with outlet 30 and outlet 28, respectively.

One of corner extrusions 38 is mounted on edge 48 of mounting plate 40. When plate 40 is in the operational position, heat exchange panel 32 will sliding engage plate 40, for support thereof.

A control box is mountable in opening 50 in the corner between top panel 12, end panel 20 and front panel 22 and sized so as not to interfere with the pivoting action of fan mounting plate 40.

On the inside face of rear panel 16 a support ledge 43 is mounted thereon. Support ledge 43 extends longitudinally and fan mounting plate 40 will engage the support ledge when in the operational position.

For servicing of the fans 42, 44, heat exchange panel 32 is removed allowing mounting plate 40 to pivot from the operational position out of the housing to the servicing position. Both fans 42, 44 are now fully accessible for servicing. To re-install, the steps are reversed.

In operation, fan 44 effects a first fluid flow through inlet 24, through the flow path defined by sheets 34 of heat exchange panel 32 and out through outlet 28. Similarly fan 42 effects a second fluid flow through inlet 26, through the flow path defined by sheets 36 and out through outlet 30.

It is now apparent to a person skilled in the art that the housing of the present invention could be readily modified. It is understood that certain changes in style, size and components may be effective without departure from the spirit of the invention and within the scope of the appended claims.

I claim:

1. In a heat recovery ventilator comprising a housing having an inlet and an outlet for a first fluid flow and an inlet and an outlet for a second fluid flow, a heat exchange panel assembly having two sets of panels alternately arranged to form a first and a second flow path for each of the first fluid flow and the second fluid, said first flow path in fluid communication with said first fluid flow inlet and outlet and said second flow path in fluid communication with said second fluid flow inlet and outlet, said heat exchange panel slidably mounted within said housing, a first fan and a second fan mounted on a fan mounting plate, wherein the improvement comprises said fan mounting plate is hingedly mounted to said housing and is pivotable between a servicing position and an operational position, said first and second fans are removable from the housing for servicing upon rotating said fan mounting plate to said servicing position and are positioned within said housing for effecting said first fluid flow and said second fluid flow when said fan mounting plate is in said operational position, said heat exchange panel slidingly engages said fan mounting plate and said fan mounting plate supports said heat exchange panel when in said operational position.

2. In a heat recovery ventilator as claimed in claim 1 wherein said housing comprises a rear panel, top panel, bottom panel, two end panels and a front panel and the inlet of the first fluid flow and the outlet of the second fluid flow are mounted on one of said two end panels and the outlet of the first fluid flow and the inlet of the second fluid flow are mounted on the other of said two end panels.

3. In a heat recovery ventilator as claimed in claim 2 wherein said fan mounting plate is pivotable when the heat exchange panel is removed from the housing.

4. In a heat recovery ventilator as claimed in claim 3 wherein said fan mounting plate separates said first and second fluid flow on one side of heat exchange panel.

\* \* \* \* \*